United States Patent
Lin et al.

(10) Patent No.: US 12,446,069 B2
(45) Date of Patent: Oct. 14, 2025

(54) USER EQUIPMENTS, AND BASE STATIONS

(71) Applicant: Sharp Kabushiki Kaisha, Osaka (JP)

(72) Inventors: Huifa Lin, Sakai (JP); Shoichi Suzuki, Sakai (JP); Daiichiro Nakashima, Sakai (JP); Toshizo Nogami, Sakai (JP); Wataru Ouchi, Sakai (JP); Tomoki Yoshimura, Sakai (JP); Takahisa Fukui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 363 days.

(21) Appl. No.: 18/025,193

(22) PCT Filed: Sep. 14, 2021

(86) PCT No.: PCT/JP2021/034446
§ 371 (c)(1),
(2) Date: Mar. 8, 2023

(87) PCT Pub. No.: WO2022/059795
PCT Pub. Date: Mar. 24, 2022

(65) Prior Publication Data
US 2023/0337279 A1    Oct. 19, 2023

(30) Foreign Application Priority Data

Sep. 16, 2020    (JP) ................. 2020-155313

(51) Int. Cl.
*H04W 74/0808*    (2024.01)

(52) U.S. Cl.
CPC .............. *H04W 74/0808* (2013.01)

(58) Field of Classification Search
CPC .................... H04W 74/0808; Y02D 30/70
See application file for complete search history.

(56) References Cited

U.S. PATENT DOCUMENTS

| | | | |
|---|---|---|---|
| 2021/0195643 A1* | 6/2021 | Talarico | H04W 74/0816 |
| 2022/0046708 A1* | 2/2022 | Sun | H04W 74/002 |
| 2023/0180293 A1* | 6/2023 | Calcev | H04W 16/14 370/328 |
| 2024/0032092 A1* | 1/2024 | Salah | H04W 74/0808 |

OTHER PUBLICATIONS

Catt (3GPP TSG RAN WG1 #102-e, R1-2005703, e-Meeting, Aug. 17-28, 2020, Enhancements for unlicensed band URLLC/IIoT; hereinafter NPL1) (Year: 2020).*
Official Communication issued in International Patent Application No. PCT/JP2021/034446, mailed on Nov. 22, 2021.
Catt, "Enhancements for unlicensed band URLLC/IIot", 3GPP TSG RAN WG1 Meeting #102-e, R1-2005703, Aug. 17-28, 2020, 6 pages.

* cited by examiner

*Primary Examiner* — Michael A Keller
(74) *Attorney, Agent, or Firm* — Keating & Bennett, LLP

(57) ABSTRACT

Terminal device initiates a COT-u at the beginning of an FFP-u after the channel is sensed to be idle. In a case that the maximum COT overlaps with an IP-g and the beginning of the IP-g is before the beginning of the IP-u, the uplink transmission is paused before or at the beginning of the IP-g and the uplink transmission is resumed after the channel is sensed to be idle.

3 Claims, 15 Drawing Sheets

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

Figure 2

USER EQUIPMENTS, AND BASE STATIONS

TECHNICAL FIELD

The present invention relates to a terminal device, and a base station device.

BACKGROUND ART

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 is an example showing the relationship between subcarrier-spacing configuration u, a number of OFDM symbols per slot $N^{slot}_{symb}$, and the CP configuration according to an aspect of the present embodiment;

DESCRIPTION OF EMBODIMENTS floor (CX) may be a floor function for real number CX. For example, floor (CX) may be a function that provides the largest integer within a range that does not exceed the real number CX. ceil (DX) may be a ceiling function to a real number DX. For example, ceil (DX) may be a function that provides the smallest integer within the range not less than the real number DX. mod (EX, FX) may be a function that provides the remainder obtained by dividing EX by FX. mod (EX, FX) may be a function that provides a value which corresponds to the remainder of dividing EX by FX. exp (GX) may be an exponential function that may be expressed as $e^{GX}$, where e is the Napier number. $(HX)^{\wedge}(IX)$ indicates IX to the power of HX. $\log_B(JX)$ indicates logarithm of JX to base B. max(KX, LX) indicates the maximum value between KX and LX.

In a wireless communication system according to one aspect of the present embodiment, at least OFDM (Orthogonal Frequency Division Multiplex) is used. An OFDM symbol is a time domain unit in the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

An OFDM symbol may be a designation including a CP added to the OFDM symbol. That is, an OFDM symbol may be configured to include the OFDM symbol and a CP added to the OFDM symbol.

Figure 1:
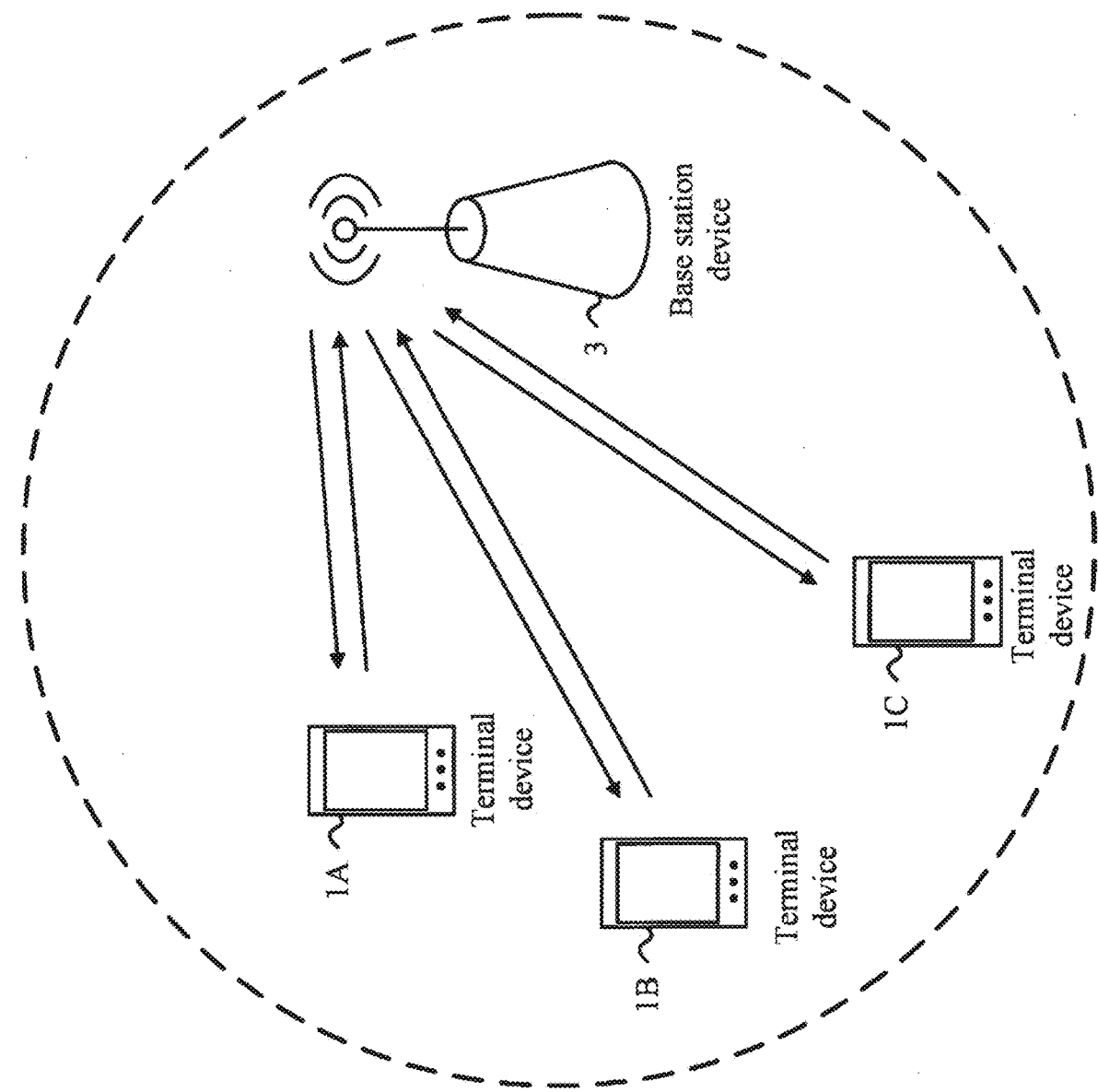
FIG. 1 is a conceptual diagram of a wireless communication system according to an aspect of the present embodiment.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

For example, one resource grid may be provided for one component carrier. For example, one resource grid may be provided for one component carrier and a subcarrier-spacing configuration u. A subcarrier-spacing configuration u is also referred to as numerology. A resource grid includes $N^{size,\,u}_{grid,\,x} N^{RB}_{sc}$ subcarriers. The resource grid starts from a common resource block with index $N^{start,\,u}_{grid}$. The common resource block with the index $N^{start,\,u}_{grid}$ is also referred to as a reference point of the resource grid. The resource grid includes $N^{subframe,\,u}_{symb}$ OFDM symbols. The subscript x indicates the transmission direction that may be either downlink or uplink. One resource grid is provided for an antenna port p, a subcarrier-spacing configuration u, and a transmission direction x.

$N^{size,\,u}_{grid,x}$ and $N^{start,\,u}_{grid}$ are given based at least on a higher-layer parameter (e.g. referred to as higher-layer parameter CarrierBandwidth). The higher-layer parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIG. 2 is an example showing the relationship between subcarrier-spacing configuration u, a number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame,\,u}_{slot}=40$, $N^{subframe,\,u}_{slot}=4$. Further, in FIG. 2B, for example, when the subcarrier-spacing configuration u is set to 2 and the CP configuration is set to an extended CP (extended cyclic prefix), $N^{slot}_{symb}=12$, $N^{frame,\,u}_{slot}=40$, $N^{subframe,\,u}_{slot}=4$.

In the wireless communication system according to an aspect of the present embodiment, a time unit $T_c$ may be used to represent the length of the time domain. The time unit $T_c$ is given by $T_c=1/(df_{max}*N_f)$, where $df_{max}=480$ kHz and $N_f=4096$. The constant k is given by $k=df_{max}*N_f/(df_{ref}N_{f,\,ref})=64$, where $df_{ref}=15$ kHz and $N_{f,\,ref}=2048$.

Transmission of signals in the downlink and/or transmission of signals in the uplink may be organized into radio frames (system frames, frames) of length $T_f$, where $T_f=(df_{max}N_f/100)*T_s=10$ ms. One radio frame is configured to include ten subframes. The subframe length is $T_{sf}=(df_{max}N_f/1000)T_s=1$ ms. A number of OFDM symbols per subframe is $N^{subframe,\,u}_{symb}=N^{slot}_{symb}N^{subframe,\,u}_{slot}$.

For a subcarrier-spacing configuration u, a number of slots included in a subframe and indexes may be given. For example, slot index $n^u_s$ may be given in ascending order with an integer value ranging from 0 to $N^{subframe,u}_{slot}-1$ in a subframe. For subcarrier-spacing configuration u, a number of slots included in a radio frame and indexes of slots included in the radio frame may be given. Also, the slot index $n^u_{s,f}$ may be given in ascending order with an integer value ranging from 0 to $N^{frame,u}_{slot}-1$ in the radio frame. Consecutive $N^{slot}_{symb}$ OFDM symbols may be included in one slot. It is $N^{slot}_{symb}=14$.

Figure 3:
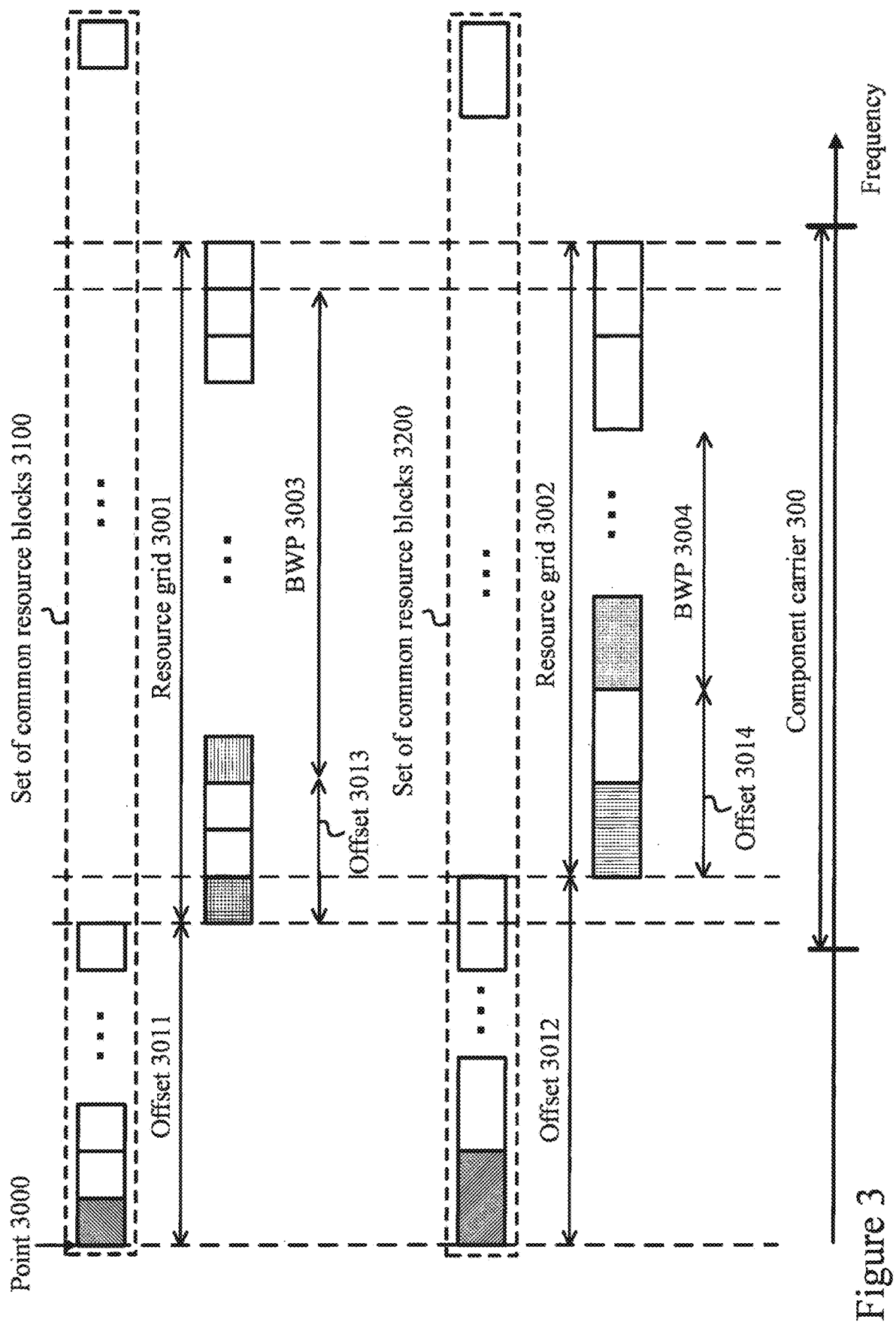
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration $u=u_1$ in the component carrier 300 and a configuration example of a resource grid of subcarrier-spacing configuration $u=u_2$ in a component carrier. One or more subcarrier-spacing configuration may be set for a component carrier. Although it is assumed in FIG. 3 that $u_1=u_2-1$, various aspects of this embodiment are not limited to the condition of $u_1=u_2-1$.

The component carrier 300 is a band having a predetermined width in the frequency domain.

Point (Point) 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, the common resource block including the point 3000 (the block indicated by the upper right diagonal line in FIG. 3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by a number of common resource blocks which is relative to the subcarrier-spacing configuration $u_1$. The resource grid 3001 includes $N^{size,u}_{grid1,x}$ common resource blocks starting from the reference point of the resource grid 3001.

The offset 3013 is an offset from the reference point of the resource grid 3001 to the reference point($N^{start,u}_{BWP,i1}$) of the BWP (BandWidth Part) 3003 of the index i1.

Common resource block-set 3200 is a set of common resource blocks with respect to subcarrier-spacing configuration $u_2$.

A common resource block including the point 3000 (a block indicated by a left-upward hatching in FIG. 3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by a number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point($N^{start,u}_{BWP,i2}$) of the BWP 3004 with index $i_2$.

Figure 4:
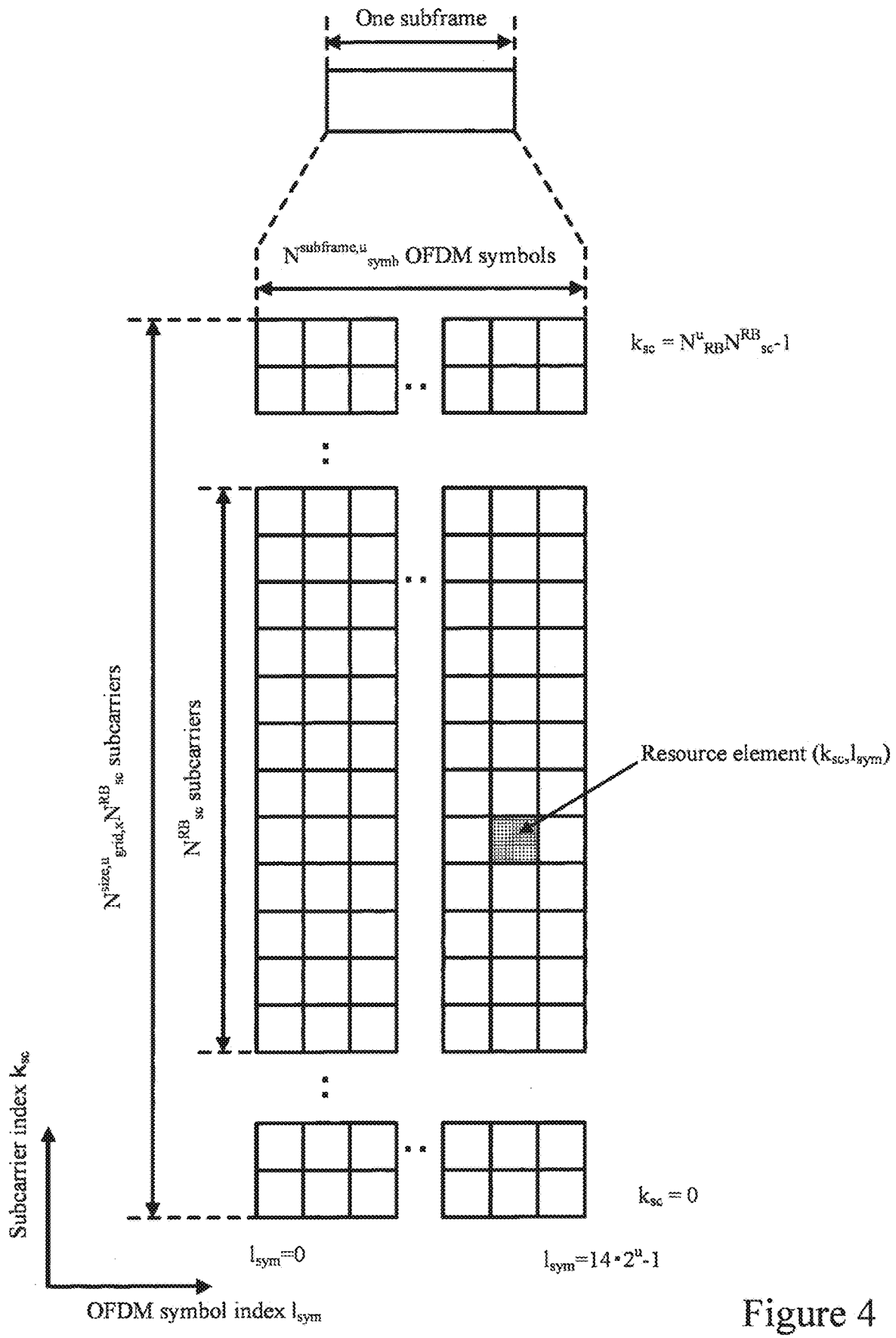
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1,x} N^{RB}_{sc}$ subcarriers, and includes $N^{subframe,u}_{symb}$ OFDM symbols. A resource specified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). $N^{RB}_{sc}$ may be 12.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=\text{ceil}(k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
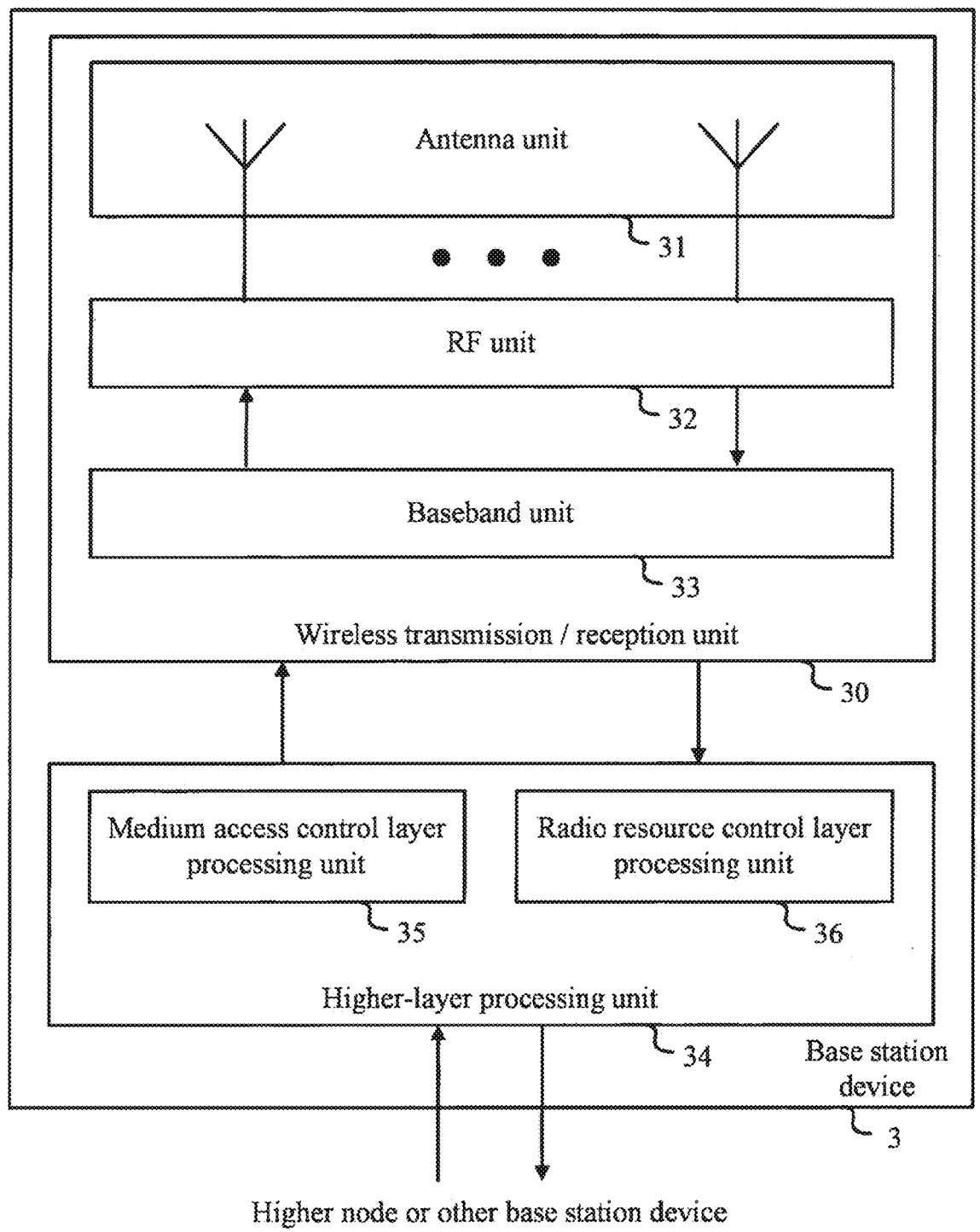
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part of or all the wireless transmission/reception unit (physical layer processing unit) 30 and the higher-layer processing unit 34. The wireless transmission/reception unit 30 includes at least a part of or all the antenna unit 31, the RF unit 32 (Radio Frequency unit 32), and the baseband unit 33. The higher-layer processing unit 34 includes at least a part of or all the medium access control layer processing unit 35 and the radio resource control (RRC: Radio Resource Control) layer processing unit 36.

The wireless transmission/reception unit 30 includes at least a part of or all a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts OFDM symbols in the physical signal to a baseband signal by conversion to a time-continuous signal. The wireless transmission/reception unit 30 (or the wireless transmission unit 30a) transmits the baseband signal (or the physical signal) to the terminal device 1 via radio frequency. The wireless transmission/reception unit 30 (or the wireless transmission unit 30a) may arrange the baseband signal (or the physical signal) on a component carrier and transmit the baseband signal (or the physical signal) to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the higher-layer processing unit 34. The wireless transmission/reception unit 30

(or the wireless reception unit 30b) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency, and transmits it via the antenna unit 31. The RF unit 32 may have a function of controlling transmission power. The RF unit 32 is also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
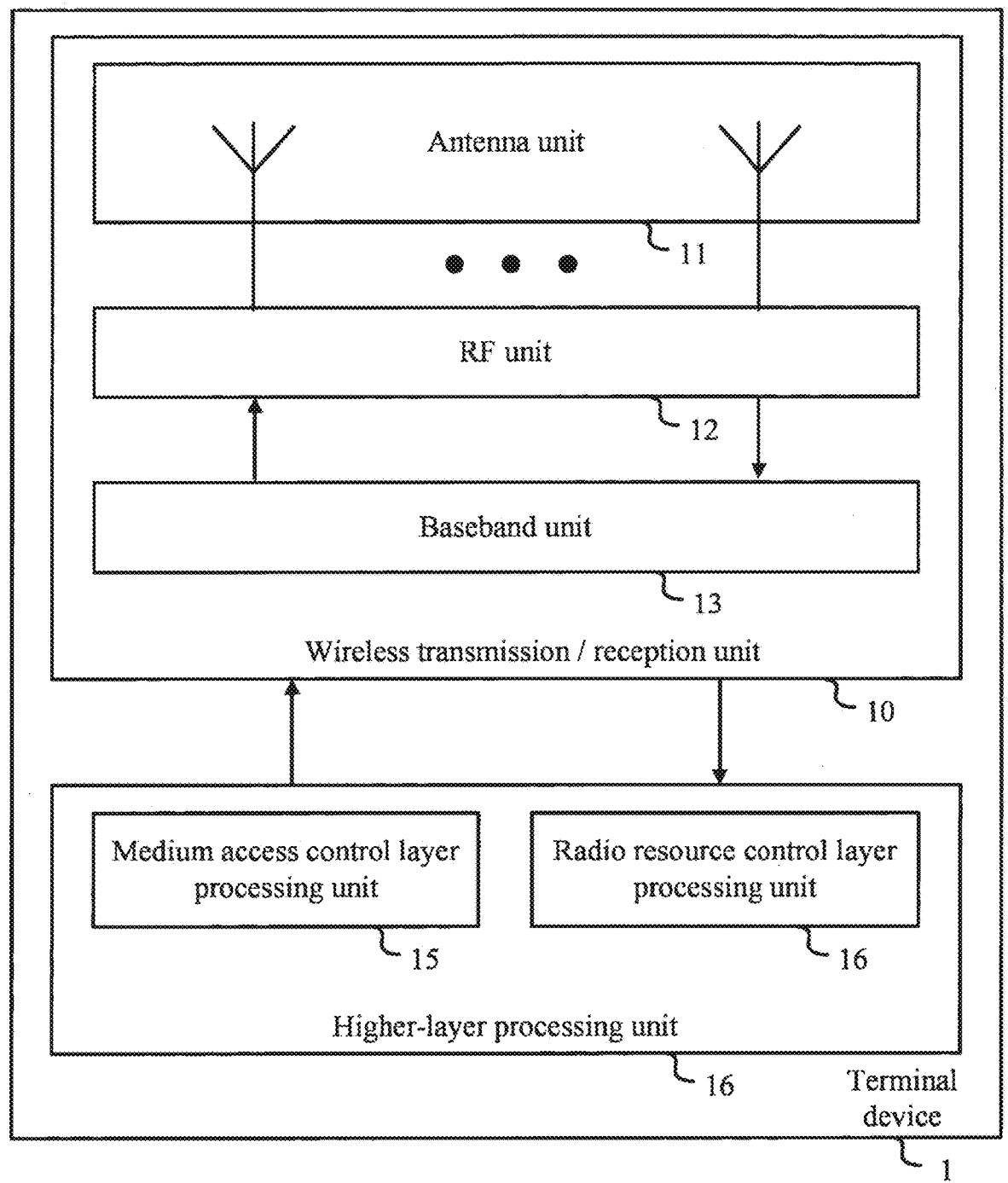
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part of or all the wireless transmission/reception unit (physical layer processing unit) 10 and the higher-layer processing unit 14. The wireless transmission/reception unit 10 includes at least a part of or all the antenna unit 11, the RF unit 12, and the baseband unit 13. The higher-layer processing unit 14 includes at least a part of or all the medium access control layer processing unit 15 and the radio resource control layer processing unit 16.

The wireless transmission/reception unit 10 includes at least a part of or all a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10b may be the same or different.

The higher-layer processing unit 14 provides uplink data (a transport block) to the wireless transmission/reception unit 10 (or the wireless transmission unit 10a). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10a) performs processing such as encoding and modulation. The wireless transmission/reception unit 10 (or the wireless transmission unit 10a) generates a physical signal by encoding and modulating the uplink data. The wireless transmission/reception unit 10 (or the wireless transmission unit 10a) converts OFDM symbols in the physical signal to a baseband signal by conversion to a time-continuous signal. The wireless transmission/reception unit 10 (or the wireless transmission unit 10a) transmits the baseband signal (or the physical signal) to the base station device 3 via radio frequency. The wireless transmission/reception unit 10 (or the wireless transmission unit 10a) may arrange the baseband signal (or the physical signal) on a BWP (active uplink BWP) and transmit the baseband signal (or the physical signal) to the base station device 3.

The wireless transmission/reception unit 10 (or the wireless reception unit 10b) performs processing such as demodulation and decoding. The wireless transmission/reception unit 10 (or the wireless reception unit 10b) may receive a physical signal in a BWP (active downlink BWP) of a serving cell. The wireless transmission/reception unit 10 (or the wireless reception unit 10b) separates, demodulates and decodes the received physical signal, and provides the decoded information to the higher-layer processing unit 14. The wireless transmission/reception unit 10 (or the wireless reception unit 10b) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency, and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical signals, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI: Uplink Control Information). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI: Channel State Information), scheduling request (SR: Scheduling Request), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part of or all a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

A PRACH may be used to transmit a random-access preamble. The PRACH may be used to convey a random-access preamble. The sequence $x_{u,v}(n)$ of the PRACH is defined by $x_{u,v}(n)=x_u(\mod(n+C_v, L_{RA}))$. The $x_u$ may be a ZC sequence (Zadoff-Chu sequence). The $x_u$ may be defined by $x_u=\exp(-jpui(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 may transmit the PRACH. The base station device 3 may receive the PRACH.

For a given PRACH opportunity, 64 random-access preambles are defined. The random-access preamble is specified (determined, given) at least based on the cyclic shift $C_v$ of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part of or all UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part of or all PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part of or all fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part of or all a target coding rate for the PUSCH. The MCS field included in the DCI format 0_0 may be at least used to indicate a modulation scheme for a PUSCH scheduled by the DCI format 0_0 and/or a part of or all a target coding rate for the PUSCH. A size of a transport block (TBS: Transport Block Size) of a PUSCH may be given based at least on a target coding rate and a part of or all a modulation scheme for the PUSCH.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 0_0 is arranged.

The DCI format 0_1 is at least used for scheduling of a PUSCH for a cell (or arranged on a cell). The DCI format 0_1 includes at least a part of or all fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part of or all a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When a number of uplink BWPs configured in the terminal device 1 in an uplink component carrier is two or more, a number of bits for the BWP field included in the DCI format 0_1 used for scheduling a PUSCH arranged on the uplink component carrier may be one or more. When a number of uplink BWPs configured in the terminal device 1 in an uplink component carrier is one, a number of bits for the BWP field included in the DCI format 0_1 used for scheduling a PUSCH arranged on the uplink component carrier may be zero.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When a number of uplink component carriers (or a number of serving cells) configured in the terminal device 1 in a serving cell group is two or more (when uplink carrier aggregation is operated in a serving cell group), or when cross-carrier scheduling is configured for the serving cell group, a number of bits for the carrier indicator field included in the DCI format 0_1 used for scheduling a PUSCH arranged on the serving cell group may be one or more (e.g., 3). When a number of uplink component carriers (or a number of serving cells) configured in the terminal device 1 in a serving cell group is one (or when uplink carrier aggregation is not operated in a serving cell group), or when the cross-carrier scheduling is not configured for the serving cell group, a number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part of or all fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part of or all a target coding rate for the PDSCH. The MCS field included in the DCI format 1_0 may be at least used to indicate a modulation scheme for a PDSCH scheduled by the DCI format 1_0 and/or a part of or all a target coding rate for the PDSCH. A size of a transport block (TBS: Transport Block Size) of a PDSCH may be given based at least on a target coding rate and a part of or all a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part of or all fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 1_1 may be at least used to indicate the assignment of time resources for a PDSCH scheduled by the DCI format 1_1.

The MCS field included in the DCI format 1_1 may be at least used to indicate a modulation scheme for a PDSCH and/or a part of or all a target coding rate for the PDSCH. The MCS field included in the DCI format 1_1 may be at least used to indicate a modulation scheme for a PDSCH scheduled by the DCI format 1_1 and/or a part of or all a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1 1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When a number of downlink BWPs configured in the terminal device 1 in a downlink component carrier is two or more, a number of bits for the BWP field included in the DCI format 1_1 used for scheduling a PDSCH arranged on the downlink component carrier may be one or more. When a number of downlink BWPs configured in the terminal device 1 in a downlink component carrier is one, a number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When a number of downlink component carriers (or a number of serving cells) configured in the terminal device 1 in a serving cell group is two or more (when downlink carrier aggregation is operated in a serving cell group), or when cross-carrier scheduling is configured for the serving cell group, a number of bits for the carrier indicator field included in the DCI format 1_1 used for scheduling a PDSCH arranged on the serving cell group may be one or more (e.g., 3). When a number of downlink component carriers (or a number of serving cells) configured in the terminal device 1 in a serving cell group is one (or when downlink carrier aggregation is not operated in a serving cell group), or when the cross-carrier scheduling is not configured for the serving cell group, a number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part of or all an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
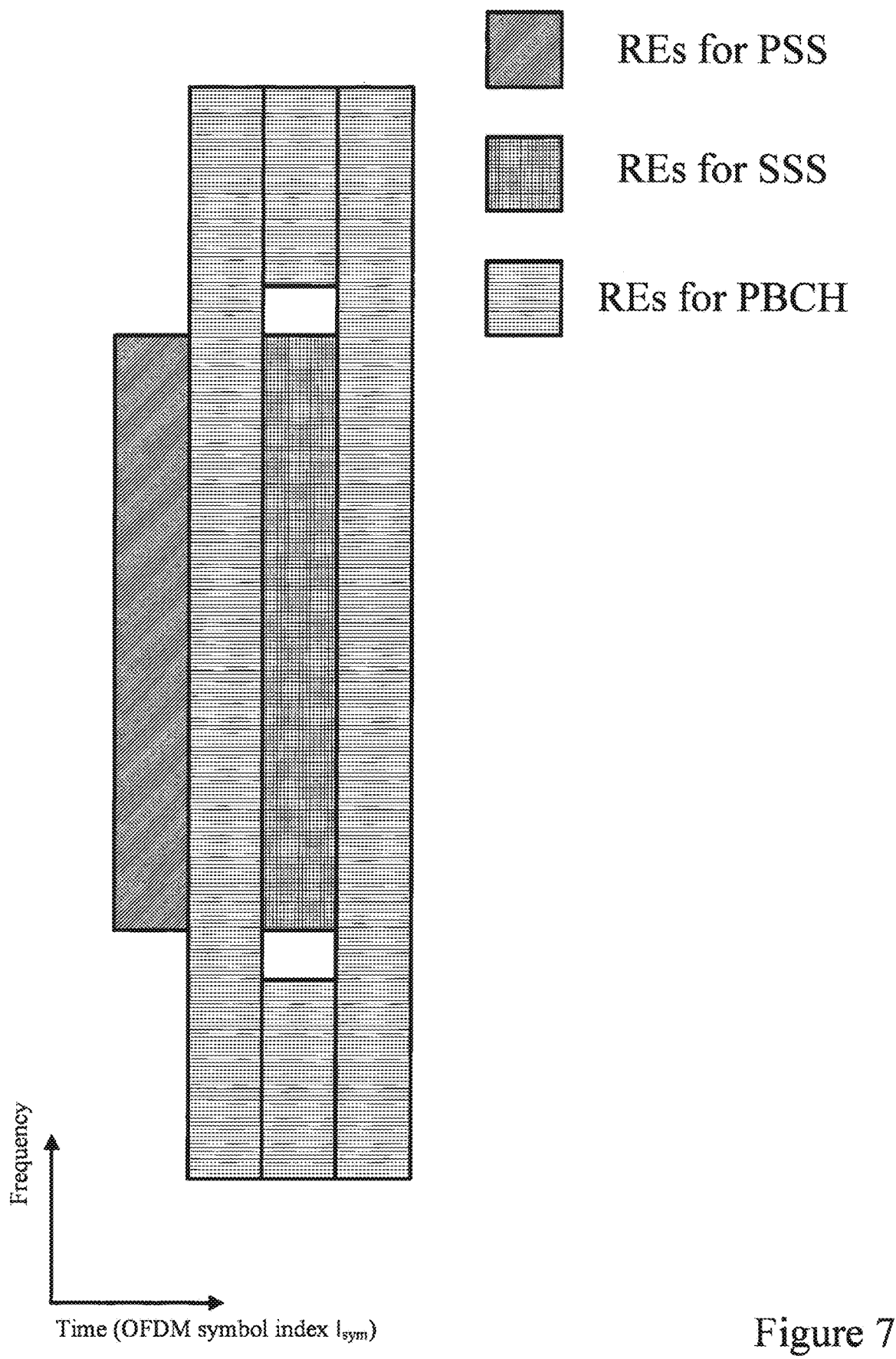
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $l_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE.

The procedure performed by the terminal device 1 includes at least a part of or all the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID.

An SS/PBCH block candidate indicates a resource for which transmission of the SS/PBCH block may exist. An SS/PBCH block may be transmitted at a resource indicated as the SS/PBCH block candidate. The base station device 3 may transmit an SS/PBCH block at an SS/PBCH block candidate. The terminal device 1 may receive (detect) the SS/PBCH block at the SS/PBCH block candidate.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks of one or more indexes at a predetermined cycle. The terminal device 1 may detect an SS/PBCH block of at least one of the SS/PBCH blocks of the one or more indexes. The terminal device 1 may attempt to decode the PBCH included in the SS/PBCH block.

The random-access is a procedure including at least a part of or all message 1, message 2, message 3, and message 4.

The message 1 is a procedure in which the terminal device 1 transmits a PRACH. The terminal device 1 transmits the PRACH in one PRACH occasion selected from among one or more PRACH occasions based on at least the index of the SS/PBCH block candidate detected based on the cell search.

PRACH occasion configuration may include at least part or all of a PRACH configuration period (PCF) $T_{PCF}$, number of PRACH occasions $N^{PCF}_{RO, t}$ included in the time domain of a PRACH configuration period, the number of PRACH occasions included in the frequency domain $N_{RO, f}$, number $N^{RO}_{preamble}$ of random-access preambles per PRACH occasion allocated for random-access, number of preambles allocated per index of SS/PBCH block candidate for contention based random-access (CBRA), $N^{SSB}_{preamble, CBRA}$, and number of PRACH occasions $N^{SSB}_{RO}$ allocated per index of SS/PBCH block candidate for contention based random-access.

At least based on the PRACH occasion configuration, at least part or all of time domain resources and frequency domain resources for a PRACH occasion.

An association between an index of an SS/PBCH block candidate that corresponds to an SS/PBCH block detected by the terminal device 1 and a PRACH occasion may be provided at least based on first bitmap information indicating one or more indexes of SS/PBCH block candidates used for transmission of actually-transmitted SS/PBCH blocks. The terminal device 1 may determine an association between the index of SS/PBCH block candidate including an SS/PBCH block detected by the terminal device 1 and PRACH occasions. For example, the first element of the first bitmap information may correspond to an SS/PBCH block candidate with index 0. For example, the second element of the first bitmap information may correspond to an SS/PBCH block candidate with index 1. For example, the $L_{SSB}-1^{th}$ element of the first bitmap information may correspond to an SS/PBCH block candidate with index $L_{SSB}-1$. The $L_{SSB}$ is number of SS/PBCH block candidates included in an SS-burst-set.

Figure 8:
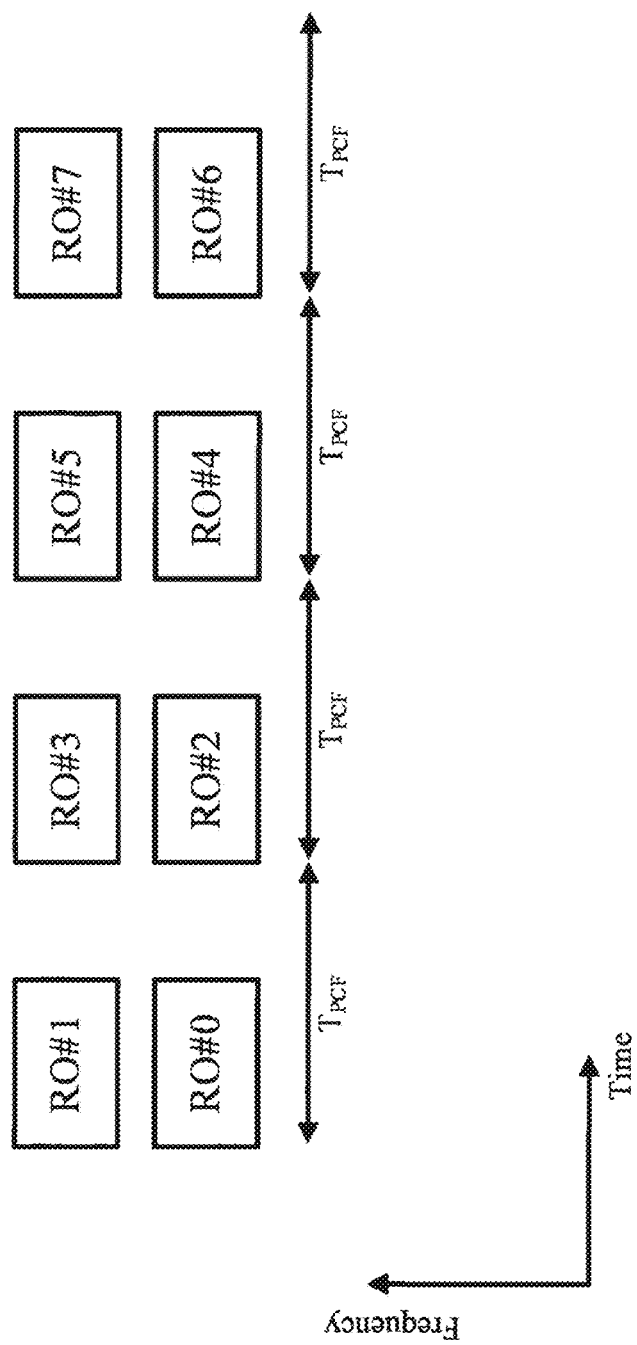
FIG. 8 is a diagram illustrating an example of setting of a PRACH resource according to an aspect of the present embodiment.

FIG. 8 is a diagram illustrating an example of setting of a PRACH resource according to an aspect of the present embodiment. In FIG. 8, the PRACH configuration period $T_{PCF}$ is 40 ms, the number of PRACH occasions included in the time domain of a PRACH configuration period $N^{PCF}_{RO,t}$ is 1, and the number of PRACH occasions included in the frequency domain $N_{RO,f}$ is 2.

For example, the first bitmap information (ssb-PositionInBurst) indicating the indexes of SS/PBCH block candidates used for transmission of SS/PBCH blocks is {1, 1, 0, 1, 0, 1, 0, 0}. The indexes of the SS/PBCH block candidates used for transmission of the SS/PBCH blocks is also called as actually transmitted SS/PBCH block or actually-transmitted SS/PBCH block candidate.

Figure 9:
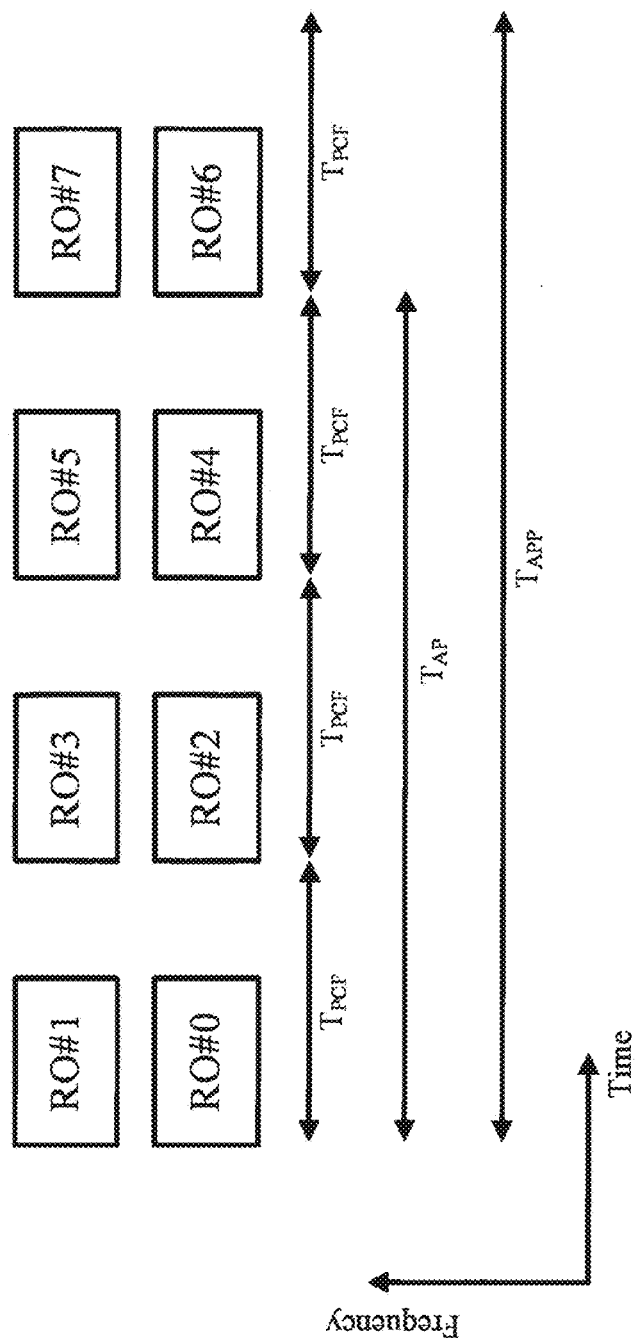
FIG. 9 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to $\{1,1,0,1,0,1,1,0\}$ according to an aspect of the embodiment.

FIG. 9 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to {1,1,0,1,0,1,0} according to an aspect of the embodiment. In FIG. 9, it is assumed that PRACH occasion configuration is the same as in FIG. 8. In FIG. 9, the SS/PBCH block candidate with index 0 may correspond to the PRACH occasion (RO #0) with index 0, the SS/PBCH block candidate with index 1 may correspond to the PRACH occasion (RO #1) with index 1, and the SS/PBCH block candidate with index 3 may correspond to the PRACH occasion (RO #2) with index 2, the SS/PBCH block candidate with index 5 may correspond to the PRACH occasion (RO #3) with index 3, and the SS/PBCH block candidate with index 6 may correspond to the PRACH opportunity of index 4 (RO #4). In FIG. 9, a PRACH association period (PRACH AP) $T_{AP}$ is 120 ms including PRACH occasions from index 0 to index 4. In FIG. 9, PRACH association pattern period (PRACH APP) $T_{APP}$ is 160 ms. In FIG. 9, the PRACH association pattern period includes one PRACH association period.

Figure 10:
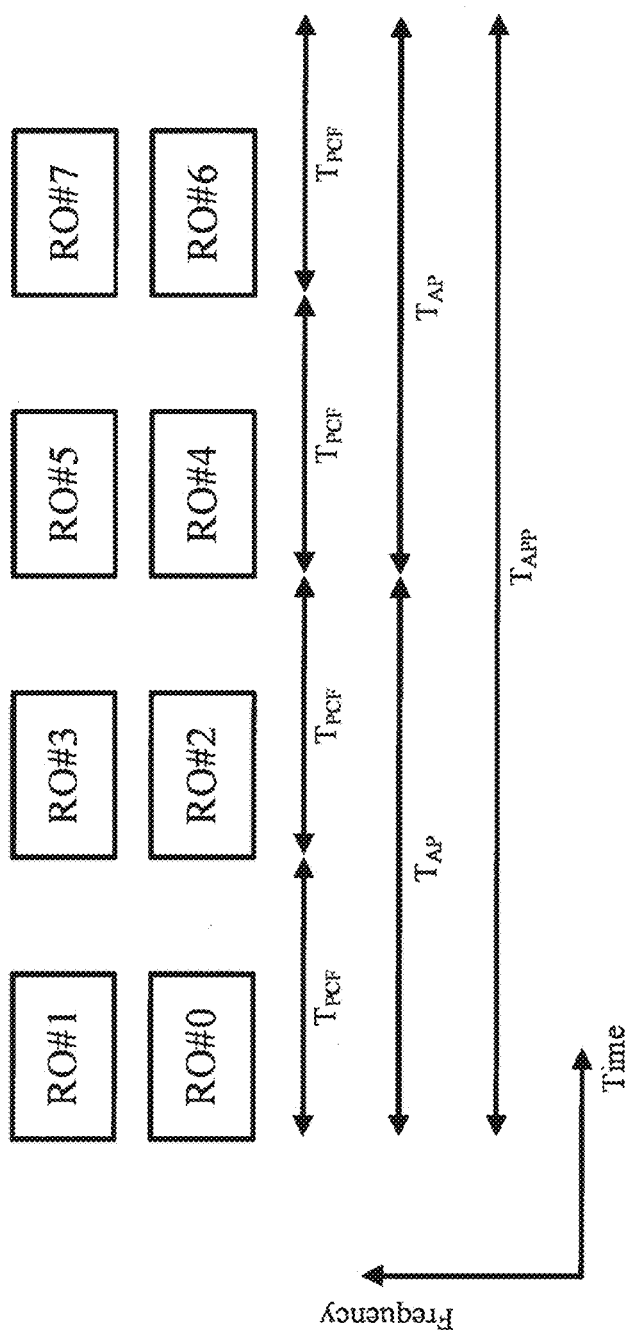
FIG. 10 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to $\{1,1,0,1,0,1,0,0\}$ according to an aspect of the embodiment.

FIG. 10 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to {1,1,0,1,0,1,0,0} according to an aspect of the embodiment. In FIG. 10, it is assumed that PRACH occasion configuration is the same as in FIG. 8. In FIG. 10, the SS/PBCH block candidate with index 0 may correspond to the PRACH occasion (RO #0) with index 0 and the PRACH occasion (RO #4) with index 4, the SS/PBCH block candidate with index 1 may correspond to the PRACH occasion (RO #1) with index 1 and the PRACH occasion (RO #5) with index 5, the SS/PBCH block candidate with index 3 may correspond to the PRACH occasion (RO #2) with index 2 and the PRACH occasion (RO #6) with index 6, the SS/PBCH block candidate with index 5 may correspond to the PRACH occasion (RO #3) with index 3 and the PRACH occasion (RO #7) with index 7. In FIG. 10, a PRACH association period (PRACH AP) $T_{AP}$ is 80 ms including PRACH occasions from index 0 to index 3. In FIG. 9, PRACH association pattern period (PRACH APP) $T_{APP}$ is 160 ms. In FIG. 9, the PRACH association pattern period includes two PRACH association periods.

The smallest index of "the SS/PBCH block candidates actually used for transmission of SS/PBCH blocks" indicated by the first bitmap information may correspond to the first PRACH occasion (the PRACH occasion with index 0). The n-th index of "the SS/PBCH block candidates actually used for transmission of SS/PBCH blocks" indicated by the first bitmap information may correspond to the n-th PRACH occasion (the PRACH occasion with index n-1).

The index of the PRACH occasion is set to the PRACH occasions included in the PRACH association pattern period with priority given to the frequency axis (Frequency-first time-second).

In FIG. 9, PRACH occasions which corresponds to at least one actually-transmitted SS/PBCH block candidates are the PRACH occasion with index 0 to 4, and the PRACH configuration periods including at least one PRACH occasion which corresponds to at least one actually-transmitted SS/PBCH block candidates are first to third PRACH configuration periods. In FIG. 10, PRACH occasions which corresponds to at least one actually-transmitted SS/PBCH block candidates are the PRACH occasion with index 0 to 3, and the PRACH configuration periods including at least one PRACH occasion which corresponds to at least one actually-transmitted SS/PBCH block candidates are first to second PRACH configuration periods.

When the maximum integer k satisfying $T_{APP} > k*T_{AP}$ is 2 or more, one PRACH association pattern period is configured to include k PRACH association periods. In FIG. 10, since the largest integer k satisfying $T_{APP} > k*T_{AP}$ is 2, the first PRACH association period includes the two PRACH configuration periods from the beginning, and the second PRACH association period includes the third to fourth PRACH configuration periods.

The terminal device 1 may transmit a PRACH with a random-access preamble in a PRACH occasion selected from PRACH occasions which corresponds to the index of the detected SS/PBCH block candidate. The base station device 3 may receive the PRACH in the selected PRACH occasion.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by a number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a Type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part of or all 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part of or all PDCCH monitoring periodicity, PDCCH monitoring pattern within a slot, and PDCCH monitoring offset.

Figure 11:
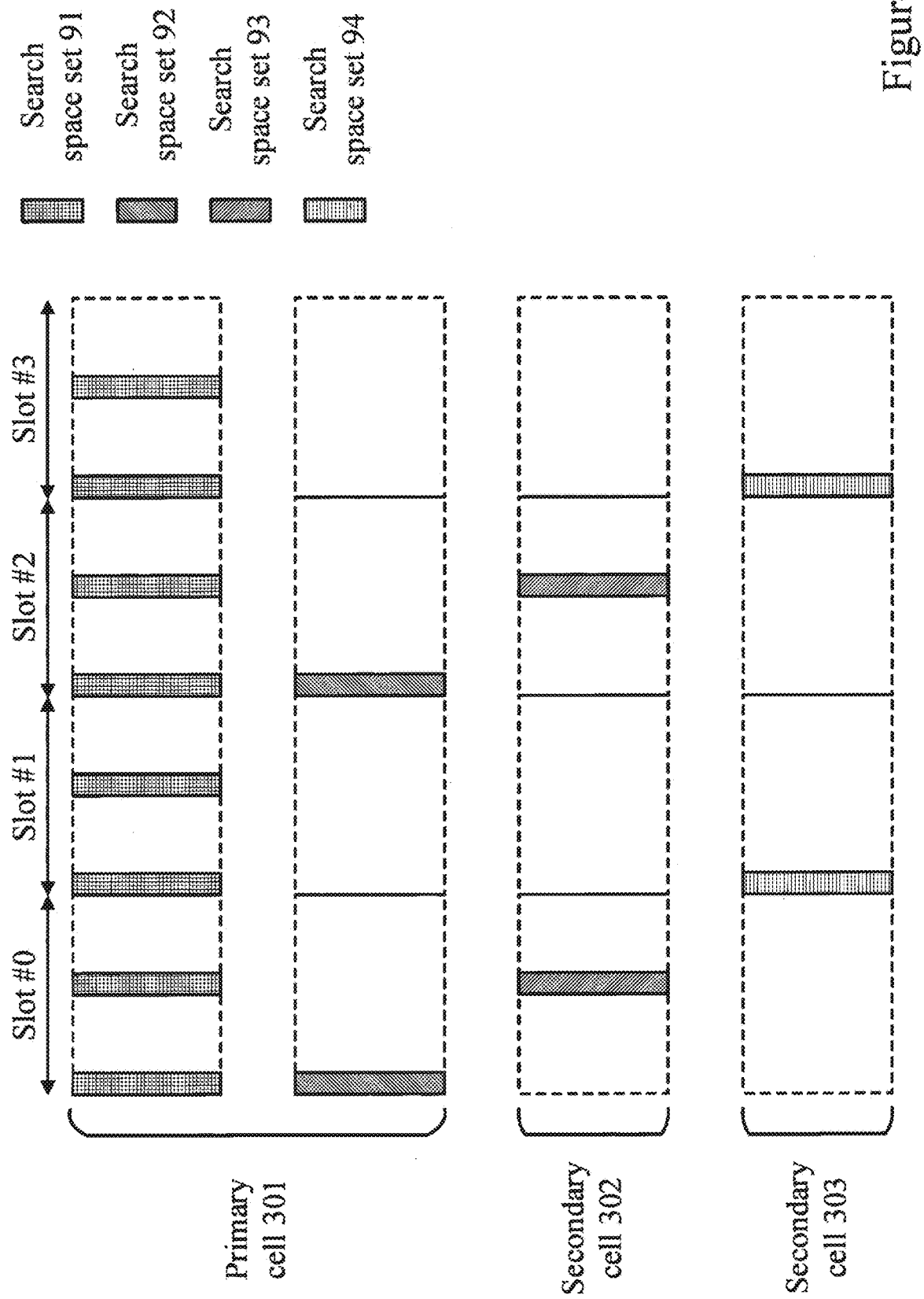
FIG. 11 is a diagram showing an example of the monitoring occasion of the search-space-set according to an aspect of the present embodiment.

FIG. 11 is a diagram showing an example of the monitoring occasion of the search-space-set according to an aspect of the present embodiment. In FIG. 11, the search-space-set 91 and the search-space-set 92 are sets in the primary cell 301, the search-space-set 93 is a set in the secondary cell 302, and the search-space-set 94 is a set in the secondary cell 303.

In FIG. 11, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 11, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 11, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 11, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 11, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The Type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

The base station device 3 and the terminal device 1 may perform a channel access procedure in the serving cell c. The base station device 3 and the terminal device 1 may perform transmission of a transmission wave in the serving cell c. For example, the serving cell c may be a serving cell configured in an Unlicensed band. The transmission wave is a physical signal transmitted from the base station device 3 to the medium or a physical signal transmitted from the terminal device 1 to the medium.

The base station device 3 and the terminal device 1 may perform a channel access procedure on the carrier f of the serving cell c. The base station device 3 and the terminal device 1 may perform transmission of a transmission wave on the carrier f of the serving cell c. The carrier f is a carrier included in the serving cell c. The carrier f may be configured by a set of resource blocks given based on higher-layer parameters.

The base station device 3 and the terminal device 1 may perform a channel access procedure on the carrier f of the serving cell c. The base station device 3 and the terminal device 1 may perform transmission of a transmission wave on the BWP b of the carrier f of the serving cell c. The BWP b is a subset of resource blocks included in the carrier f.

The base station device 3 and the terminal device 1 may perform the channel access procedure in the BWP b of the carrier f of the serving cell c. The base station device 3 and the terminal device 1 may perform transmission of a transmission wave in the carrier f of the serving cell c. Carrying out transmission of the transmission wave on the carrier f of the serving cell c may be transmission of the transmission wave on any set of the BWPs included in the carrier f of the serving cell c.

The base station device 3 and the terminal device 1 may perform the channel access procedure in the BWP b of the carrier f of the serving cell c. The base station device 3 and the terminal device 1 may transmit a transmission wave in the BWP b of the carrier f of the serving cell c.

The channel access procedure may include at least one or both of a first sensing and a counting procedure. The first channel access procedure may include a first measurement. The first channel access procedure may not include the counting procedure. The second channel access procedure may at least include both the first measurement and the counting procedure. The channel access procedure is a designation including a part of or all the first channel access procedure and the second channel access procedure.

After the first channel access procedure is performed, a transmission wave including at least an SS/PBCH block may be transmitted. After the first channel access procedure is performed, the gNB may transmit at least a part of or all an SS/PBCH block, a PDSCH including broadcast information, PDCCH including DCI format used for scheduling of the PDSCH, and a CSI-RS. After the second channel access procedure is performed, a transmission wave including at least a PDSCH including information which is other than the broadcast information may be transmitted. The PDSCH including the broadcast information may include at least a part of or all a PDSCH including system information, a PDSCH including paging information, and a PDSCH used for random-access (e.g., message 2 and/or message 4).

A transmission wave including at least a part of or all an SS/PBCH block, a PDSCH including broadcast information, a PDCCH including a DCI format used for scheduling the PDSCH, and a CSI-RS is also referred to as DRS (Discovery Reference Signal). The DRS may be a set of physical signals transmitted after the first channel access procedure.

If the period of the DRS is less than or equal to a predetermined length and the duty cycle of the DRS is less than or equal to a predetermined value, a transmission wave including the DRS may be transmitted after the first channel access procedure is performed. When the duration of the DRS exceeds the predetermined length, a transmission wave including the DRS may be transmitted after the second channel access procedure is performed. When the duty cycle of the DRS exceeds the predetermined value, a transmission wave including the DRS may be transmitted after the second channel access procedure is performed. For example, the predetermined length may be 1 ms. For example, the predetermined value may be ½0.

Transmission of a transmission wave after the channel access procedure is performed may be transmission of the transmission wave based on the channel access procedure.

The first measurement may be that the medium is detected to be idle during one or more LBT slot durations of the defer duration. Here, LBT (Listen-Before-Talk) may be a procedure in which whether the medium is idle or busy is given based on carrier sense. The carrier sense may be to perform energy detection in the medium. For example, the "busy" may be a state in which the amount of energy detected by the carrier sense is equal to or larger than a predetermined threshold. The "idle" may be a state in which the amount of energy detected by the carrier sense is smaller than the predetermined threshold. Also, it may be the "idle" that the amount of energy detected by the carrier sense is equal to the predetermined threshold. Also, it may be the "busy" that the amount of energy detected by the carrier sense is equal to the predetermined threshold. A result of carrier sense ("busy" or "idle") may be called a LBT outcome.

An LBT slot duration is a time unit of LBT. For each LBT slot duration, whether the medium is idle or busy may be provided. For example, the LBT slot duration may be 9 microseconds.

The postponement duration $T_d$ may include at least a duration $T_f$ and one or more LBT slot durations. For example, the duration $T_f$ may be 16 microseconds.

Figure 12:
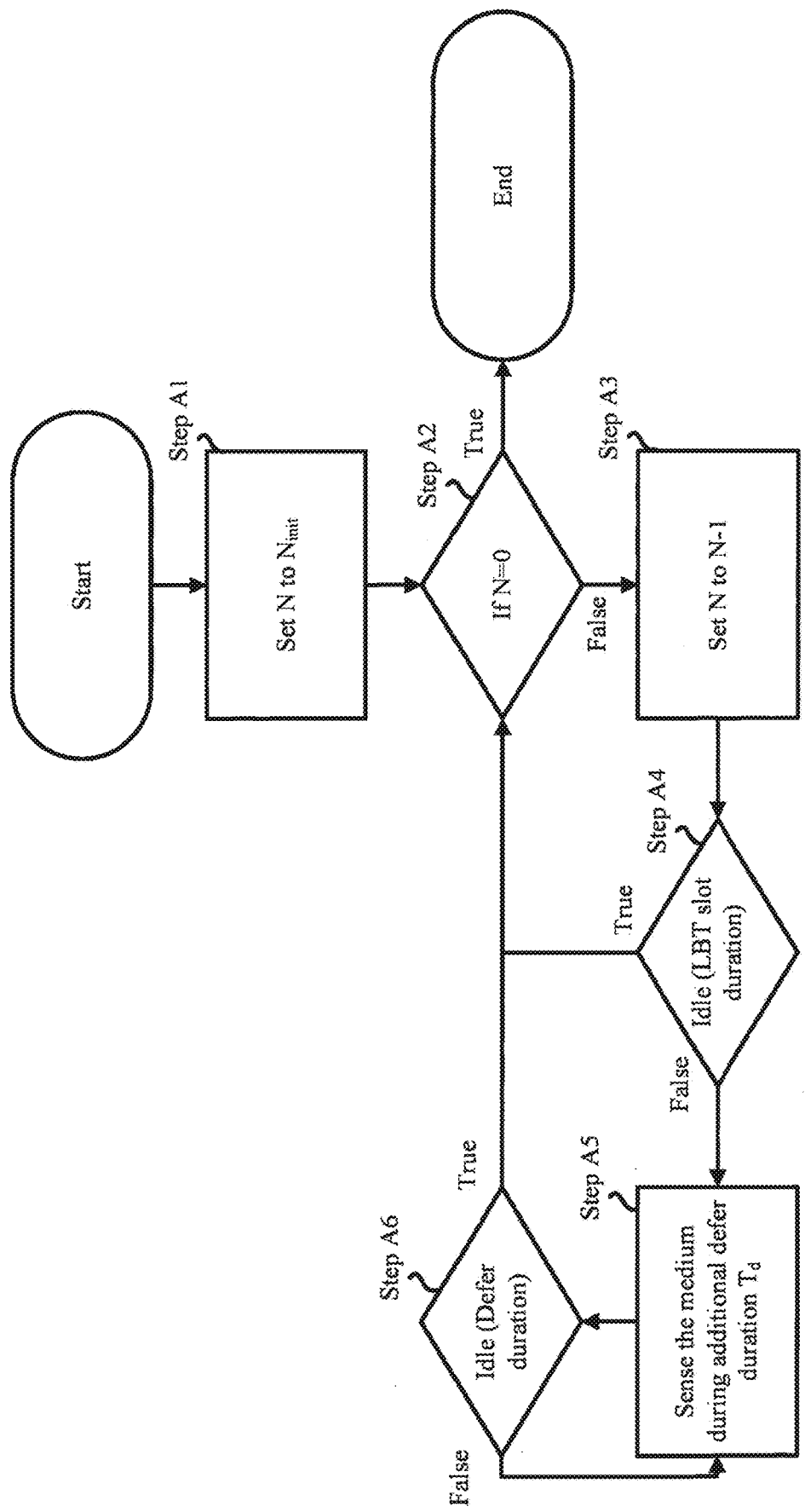
FIG. 12 is a diagram illustrating an example of the counting procedure according to an aspect of the present embodiment.

FIG. 12 is a diagram illustrating an example of the counting procedure according to an aspect of the present embodiment. The counting procedure includes at least a part of or all steps A1 to A6. Step A1 includes an operation of setting the value of the counter N to $N_{init}$. Here, the $N_{init}$ is a value which is randomly (or pseudo-randomly) selected from integer values in the range of 0 to CWp. CWp is a contention window size (CWS) for the channel access priority class p.

In Step A2, whether the value of the counter N is zero or not is determined. Step A2 includes an operation of completing (or terminating) the channel access procedure when the counter N is zero. Step A2 includes an operation of proceeding to step A3 when the counter N is not zero. In FIG. 12, the "true" corresponds to the fact that the evaluation formula is true in the step including the operation of determining the evaluation formula. Also, the "false" corresponds to the fact that the evaluation formula is false in the step including the operation of determining the evaluation formula. In Step A2, the evaluation formula corresponds to the counter N=0.

For example, Step A3 may include the step of decrementing the value of the counter N. Decrementing the value of the counter N may be to reduce the value of the counter N by one. That is, to decrement the value of the counter N may be to set the value of the counter N to N−1.

For example, Step A3 may include the step of decrementing the value of the counter N when N>0. Also, Step A3 may include the step of decrementing the value of the counter N when the base station device 3 or the terminal device 1 selects to decrement the counter N. Step A3 may also include a step of decrementing the value of the counter N when N>0 and the base station device 3 selects to decrement the counter N. Step A3 may also include a step of decrementing the value of the counter N when N>0 and the terminal device 1 selects to decrement the counter N.

For example, Step A4 may include an operation of performing carrier sense of the medium in LBT slot duration d and an operation of proceeding to step A2 if the LBT slot duration d is idle. Further, Step A4 may include an operation of proceeding to Step A2 when it is determined by carrier sense that the LBT slot duration d is idle. Further, Step A4 may include an operation of performing carrier sense in LBT slot duration d and an operation of proceeding to step A5 when LBT slot duration d is busy. Further, Step A4 may include an operation of proceeding to Step A5 when it is determined by carrier sense that the LBT slot duration d is busy. Here, the LBT slot duration d may be the next LBT slot duration of the LBT slot duration already carrier-sensed in the counting procedure. In Step A4, the evaluation formula may correspond to the LBT slot duration d being idle.

In Step A5, the medium is idle until it is detected that the medium is busy in a certain. LBT slot duration included in the delay-duration, or in all LBT slot durations included in the delay-duration. It includes an operation of performing carrier sense until "idle" is detected.

Step A6 includes an operation of proceeding to Step A5 when it is detected that the medium is busy in a certain LBT slot duration included in the delay-duration. Step A6 includes an operation that proceeds to step A2 when it is detected that the medium is idle in all LBT slot durations included in the delay-duration. In step A6, the evaluation formula may correspond to the medium being idle in the certain LBT slot duration.

$CW_{min, p}$ indicates the minimum value of the range of possible values of the contention window size CWp for the channel access priority class p. $CW_{max, p}$ indicates the maximum value of the range of possible values of the contention window size CWp for the channel access priority class p.

When a transmission wave including at least a physical channel (for example, PDSCH) associated with the channel access priority class p is transmitted, CWp is managed by the base station device 3 or the terminal device 1. The base station device 3 or the terminal device 1 adjusts the CWp before Step A1 of the counting procedure.

In a component carrier, NR-U (New Radio-Unlicensed) may be applied. In a serving cell, NR-U may be applied. Applying NR-U in a component carrier (or a serving cell) may at least include a technology (framework, configuration) including part or all of the following elements B1 to B6. The B1 is that a second SS-burst-set is configured on the component carrier (or the serving cell). The B2 is that the base station device 3 transmits a second SS/PBCH block on the component carrier (or the serving cell). The B3 is that the terminal device 1 receives the second SS/PBCH block on the component carrier (or the serving cell). The B4 is that the base station device 3 transmits the PDCCH in the second type-0 PDCCH common search-space-set in the component carrier (or the serving cell). The B5 is that the terminal device 1 receives the PDCCH in the second type-0 PDCCH common search-space-set in the component carrier (or the serving cell). The B6 is that a higher-layer parameter (for example, a field included in the MIB) associated with NR-U indicates a first value (for example, 1).

In a component carrier, NR-U may not be applied. In a serving cell, NR-U may not be applied. The fact that NR-U is not applied in a component carrier (or a serving cell) may at least include a technology (framework, configuration) including part or all of the following elements C1 to C6. The C1 is that a first SS-burst-set is configured on the component carrier (or the serving cell). The C2 is that the base station device 3 transmits the first SS/PBCH block on the component carrier (or the serving cell). The C3 is that the terminal device 1 receives the first SS/PBCH block on the component carrier (or the serving cell). The C4 is that the base station device 3 transmits a PDCCH in the first type-0 PDCCH common search-space-set in the component carrier (or the serving cell). The C5 is that the terminal device 1 receives the PDCCH in the first type-0 PDCCH common search-space-set in the component carrier (or the serving cell). The C6 is that a higher-layer parameter (for example, a field included in MIB) associated with NR-U indicates a value (for example, 0) which is different from the first value.

A component carrier may be configured to a licensed-band. A serving cell may be configured to a licensed-band. Here, configuration of a certain component carrier (or a certain serving cell) being in the licensed-band may include at least a part of or all configuration 1 to configuration 3 below. The configuration 1 may be that a higher-layer parameter indicating that a component carrier (or a serving cell) operates in a licensed-band is given. The configuration 1 may be that a higher-layer parameter indicating that a component carrier (or a serving cell) operates in an unlicensed-band is not given. The configuration 2 may be that a component carrier (or a serving cell) is configured to operate in a licensed-band. The configuration 2 may be that a component carrier (or a serving cell) is not configured to operate in an unlicensed-band. The configuration 3 may be that a component carrier (or a serving cell) is included in the licensed-band. The configuration 3 may be that a component carrier (or a serving cell) is not included in the unlicensed-band.

The licensed-band may be a frequency band for which a wireless station license is required for a terminal device 1 operating (expected to operate) in the licensed-band. The licensed-band may be a frequency band in which only a terminal device 1 manufactured by a business person (a business entity, a business, an organization, a company) who holds a wireless station license is permitted to operate. The licensed-band may be such that no channel access procedure prior to the transmission of a physical signal is required.

The unlicensed-band may be a frequency band for which a wireless station license is not required for a terminal device 1 operating in the unlicensed-band. The unlicensed-band may be a frequency band such that a terminal device 1 manufactured by a business person who holds a wireless station license and/or a business person who does not hold a wireless station license is permitted to operate. The unlicensed-band may be a frequency band requiring a channel access procedure prior to transmission of a physical signal.

Whether NR-U is applied to a component carrier (or a serving cell) or not may be determined by at least whether the component carrier (or the serving cell) is configured in an unlicensed-band or not. For example, in a case that the component carrier (or the serving cell) is configured in an unlicensed-band, the NR-U may be applied. For example, in a case that the component carrier (or the serving cell) is configured in a licensed-band, the NR-U may not be applied.

Whether NR-U is applied to a component carrier (or a serving cell) or not may be determined by at least whether the component carrier (or the serving cell) is configured in a frequency band in which the NR-U can be operated or not. For example, in a case that the component carrier (or the serving cell) is configured in the frequency band, the NR-U may be applied. For example, in a case that the component carrier (or the serving cell) is configured in the frequency band, the NR-U may not be applied.

Whether NR-U is applied to a component carrier (or a serving cell) or not may be determined based on information contained in system information. For example, when information indicating whether or not to apply NR-U is included in the MIB, and the information indicates that the NR-U is applied, NR-U may be applied to the serving cell corresponding to that MIB. On the other hand, if the information does not indicate that NR-U is applied, NR-U may not be applied to the serving cell to which the MIB corresponds.

A component carrier may be configured to an unlicensed-band. A serving cell may be configured to an unlicensed-band. Here, configuration of a certain component carrier (or a certain serving cell) being in the unlicensed-band may include at least a part of or all configuration 4 to configuration 6 below. The configuration 4 may be that a higher-layer parameter indicating that a component carrier (or a serving cell) operates in an unlicensed-band is given. The configuration 5 may be that a component carrier (or a serving cell) is configured to operate in an unlicensed-band. The configuration 5 may be that a component carrier (or a serving cell) is configured to operate in an unlicensed-band. The configuration 6 may be that a component carrier (or a serving cell) is included in the unlicensed-band. The configuration 6 may be that a component carrier (or a serving cell) is included in the unlicensed-band.

Which of the first SS/PBCH block or the second SS/PBCH block is received in the component carrier by the terminal device 1 depends on at least a part of or all whether NR-U is applied in the component carrier and whether the component carrier is configured in an unlicensed-band.

An LBT subband may include one or more contiguous resource blocks. An LBT subband may be called an RB set. Hereinafter, terminologies of "LBT subband" and "RB set" are used interchangeably. One or more downlink LBT subbands may be indicated by an RRC parameter intraCellGuardBandDL-r16. One or more downlink LBT subbands may be indicated by an RRC parameter intraCellGuardBandDL-r16. A frequency bandwidth may be an LBT subband. A frequency bandwidth may include one or more LBT subbands.

A channel refers to a carrier or a part of a carrier consisting of a contiguous set of resource blocks (RBs) on which a channel access procedure is performed in shared spectrum. A channel access procedure is a procedure based on sensing that evaluates the availability of a channel for performing transmissions. The basic unit for sensing is a sensing slot with a duration $T_{sl}$=9 us (micro second). The sensing slot duration $T_{sl}$ is considered to be idle if base station device 3 or terminal device 1 senses the channel during the sensing slot duration and determines that the detected power for at least 4 us within the sensing slot duration is less than energy detection threshold $X_{Thresh}$. Otherwise, the sensing slot duration $T_{sl}$ is considered to be busy. A Channel Occupancy (CO) refers to transmission(s) on channel(s) by base station device 3/terminal device 1 after performing the corresponding channel access procedures. A Channel Occupancy Time (COT) refers to the total time for which base station device/terminal device and any base station device/terminal device(s) sharing the CO perform transmission(s) on a channel after base station device 3/terminal device 1 performs the corresponding channel access procedures. For determining a COT, if a transmission gap is less than or equal to 25 us, the gap duration is counted in the COT. A COT can be shared for transmission between base station device 3 and the corresponding terminal device(s). A downlink transmission burst is defined as a set of transmissions from base station device 3 without any gaps greater than 16 us. Transmissions from base station device 3 separated by a gap of more than 16 us are considered as separate downlink transmission bursts. Base station device 3 can transmit transmission(s) after a gap within a downlink transmission burst without sensing the corresponding channel(s) for availability. An uplink transmission burst is defined as a set of transmissions from terminal device 1 without any gaps greater than 16 us. Transmissions from terminal device 1 separated by a gap of more than 16 us are considered as separate uplink transmission bursts. Terminal device 1 can transmit transmission(s) after a gap within an uplink transmission burst without sensing the corresponding channel(s) for availability.

In a case that terminal device 1 is provided higher layer parameters ChannelAccessMode-r16='semistatic' by SIB1 or dedicated configuration, a periodic channel occupancy can be initiated every $T_x$ within every two consecutive radio frames. $T_x$ is also termed as Fixed Frame Period (FFP). A maximum channel occupancy time may be determined as $T_y$=0.95*$T_x$. $T_x$ may be provided by a higher layer parameter Period in a unit of ms (millisecond), where the Period is included in a higher layer parameter semiStaticChannelAccessConfig-r16. Terminal device 1 may be provided with FFP configuration with respect to base station device 3. The FFP configuration with respect to base station device 3 is denoted as FFP-g. Base station device 3 may initiated a COT at the beginning of FFP-g. The COT initiated by base station device 3 is term as COT-g. Terminal device 1 may be provided with FFP configuration with respect to terminal device 1. The FFP configuration with respect to terminal device 1 is denoted as FFP-u. Terminal device 1 may initiated a COT at the beginning of FFP-u. The COT initiated by terminal device 1 is termed as COT-u. FFP-u configuration may be the same as FFP-g configuration. FFP-u configuration may be different from FFP-g configuration. FFP-u configuration may be determined at least based on FFP-g configuration. FFP-u configuration may be independent of FFP-g configuration. An Idle Period (IP) may be determined by $T_z$=max(0.05*$T_x$, 100 us), wherein $T_x$ denotes the IP. The IP is a period during which base station device 3 and/or terminal device 1 shall not (alternatively speaking, are not allowed to, are not expected to, are forbidden to) transmit any transmissions. An IP lies in the end of an FFP. An IP may be associated to an FFP-g, wherein the IP is termed as IP-g. An IP may be associated to an FFP-u, wherein the IP is termed as IP-u.

When base station device 3 attempts to initiate a COT-g, base station device 3 shall transmit a downlink transmission burst(s) starting at the beginning of the COT-g immediately after sensing the channel to be idle for at least a sensing slot duration $T_{sl}$=9 us. Base station device 3 may transmit a downlink transmission burst(s) within the COT-g immediately after sensing the channel to be idle for at least a sensing slot duration $T_{sl}$=9 us if the gap between the downlink transmission burst(s) and any previous transmission burst is more than 16 us. Base station device 3 may transmit downlink transmission burst(s) after uplink transmission burst(s) within the COT-g without sensing the channel if the gap between the downlink and uplink transmission bursts is at most 16 us. Terminal device 1 may transmit uplink transmission burst(s) after downlink transmission burst(s) within the COT-g without sensing the channel if the gap between the uplink and downlink transmission burst(s) is at most 16 us. Terminal device 1 may transmit uplink transmission burst(s) after downlink transmission burst(s) within the COT-g after sensing the channel to be idle for at least a sensing slot duration $T_{sl}$=9 us within a 25 us interval ending immediately before transmission if the gap between the uplink and downlink transmission burst(s) is at most 16 us. Base station device 3 and/or terminal device 1 shall not transmit any transmissions in a set of consecutive symbols for an IP-g duration before the start of the next COT.

When terminal device 1 attempts to initiate a COT-u, terminal device 1 may transmit an uplink transmission burst(s) starting at the beginning of the COT-u immediately after sensing the channel to be idle for at least a sensing slot duration $T_{sl}$=9 us. Alternatively, terminal device 1 may transmit an uplink transmission burst(s) starting at the beginning of the COT-u after sensing the channel to be idle for at least a sensing slot duration $T_{sl}$=9 us within an interval ending immediately before transmission. Terminal device 1 may transmit an uplink transmission burst(s) within the COT-u immediately after sensing the channel to be idle for at least a sensing slot duration $T_{sl}$=9 us if the gap between the uplink transmission burst(s) and any previous transmission burst is more than 16 us. Terminal device 1 may transmit uplink transmission burst(s) after downlink transmission burst(s) within the COT-u without sensing the channel if the gap between the uplink and downlink transmission bursts is at most 16 us. Base station device 3 may transmit downlink transmission burst(s) after uplink transmission burst(s) within the COT-u without sensing the channel if the gap between the downlink and uplink transmission burst(s) is at most 16 us. Base station device 3 may transmit downlink transmission burst(s) after uplink transmission burst(s) within the COT-u after sensing the channel to be idle for at least a sensing slot duration $T_{sl}$=9 us ending immediately before transmission if the gap between the downlink and uplink transmission burst(s) is at most 16 us. Base station device 3 and/or terminal device 1 shall not transmit any transmissions in a set of consecutive symbols for an IP-u duration before the start of the next COT.

Channel access procedure for semi-static channel occupancy is described from another perspective.

Channel assess procedures based on semi-static channel occupancy as described here, may be intended for environments where the absence of other technologies is guaranteed e.g., by level of regulations, private premises policies, etc. If a gNB (also referred to as Base station device 3) provides UE(s) with higher layer parameters ChannelAccessMode-r16='semistatic' by SIB1 or dedicated configuration, a periodic channel occupancy can be initiated by the gNB every $T_x$ (also referred to as FFP-g) within every two consecutive radio frames, starting from the even indexed radio frame at i*$T_x$ with a maximum channel occupancy time $T_y$=0.95 $T_x$, where $T_x$=period in ms (micro second), is a higher layer parameter (an RRC parameter) provided in SemiStaticChannelAccessConfig and i={0, 1, . . . , 20/$T_x$-1}. If a gNB provides UE(s) with higher layer parameters ChannelAccessModeUL='semistatic' by SIB1 or dedicated configuration, a periodic channel occupancy can be initiated by the UE (also referred to as Terminal device 1) every $T^{UL}_x$ (also referred to as FFP-u) $T^{UL}_x$ within every two consecutive radio frames, starting from the even indexed radio frame at j*$T^{UL}_x$ with a maximum channel occupancy time $T^{UL}_y$=0.95 $T^{UL}_x$, where $T^{UL}_x$=period in ms, is a higher layer parameter provided in SemiStaticChannelAccessULConfig and j={0, 1, . . . , 20/$T^{UL}_x$-1}.

In the following procedures, when a gNB or UE performs sensing for evaluating a channel availability, the sensing may be performed at least during a sensing slot duration $T_{sl}$=9 us. The corresponding $X_{Thresh}$ adjustment for performing sensing by a gNB or a UE is described above.

A channel occupancy initiated by a gNB (also referred to as COT-g) and shared with UE(s) may have to satisfy the following (a), (b), (c) and (d):

(a) The gNB may have to transmit a DL transmission burst starting at the beginning of the channel occupancy time immediately after sensing the channel to be idle for at least a sensing slot duration $T_{sl}$=9 us. If the channel is sensed to be busy, the gNB may not perform any transmission during the current period.

(b) The gNB may transmit a DL transmission burst(s) within the channel occupancy time immediately after sensing the channel to be idle for at least a sensing slot duration $T_{sl}$=9 us if the gap between the DL transmission burst(s) and any previous transmission burst is more than 16 us.

(c) The gNB may transmit DL transmission burst(s) after UL transmission burst(s) within the channel occupancy time without sensing the channel if the gap between the DL and UL transmission bursts is at most 16 us.

(d) A UE may transmit UL transmission burst(s) after detection of a DL transmission burst(s) within the channel occupancy time as described in (d-1) and (d-2):

(d-1) If the gap between the UL and DL transmission bursts is at most 16 us $^{16\ us}$, the UE may transmit UL transmission burst(s) after a DL transmission burst(s) within the channel occupancy time without sensing the channel.

(d-2) If the gap between the UL and DL transmission bursts is more than 16us $^{16\ us}$, the UE may transmit UL transmission burst(s) after a DL transmission burst(s) within the channel occupancy time after sensing the channel to be idle for at least a sensing slot duration $T_{sl}$=9us within a 25 us interval ending immediately before transmission.

The gNB and UEs may not transmit any transmissions in a set of consecutive symbols for a duration of at least $T_z$=max(0.05 $T_x$, 100 us) before the start of the next period. It is noted that this may apply to not only the channel occupancy initiated by a gNB and shared with UE(s) but also a channel occupancy initiated by a UE and shared with a gNB.

A channel occupancy initiated by a UE (also referred to as COT-u) and shared with a gNB may have to satisfy the following (e), (f), (g) and (h):

(e) The UE may have to transmit a UL transmission burst starting at the beginning of the channel occupancy time immediately after sensing the channel to be idle for at least a sensing slot duration $T_{sl}$=9 us. If the channel is sensed to be busy, the UE shall not perform any transmission during the current period.

(f) The UE may transmit a UL transmission burst(s) within the channel occupancy time immediately after sensing the channel to be idle for at least a sensing slot duration $T_{sl}$=9 us if the gap between the UL transmission burst(s) and any previous transmission burst is more than 16 us $^{16\ us}$.

(g) The UE may transmit UL transmission burst(s) after DL transmission burst(s) within the channel occupancy time without sensing the channel if the gap between the UL and DL transmission bursts is at most 16 us. $^{16\ us}$.

(h) A gNB may transmit DL transmission burst(s) after detection of a UL transmission burst(s) within the channel occupancy time as described in (h-1) and (h-2):

(h-1) If the gap between the UL and DL transmission bursts is at most 16 us, the gNB may transmit DL transmission burst(s) after a UL transmission burst(s) within the channel occupancy time without sensing the channel.

(h-2) If the gap between the UL and DL transmission bursts is more than 16 us, the gNB may transmit DL transmission burst(s) after a UL transmission burst(s) within the channel occupancy time after sensing the channel to be idle for at least a sensing slot duration $T_{sl}$=9 us within a 25 us interval ending immediately before transmission.

The UE may not transmit any transmissions in a set of consecutive symbols for a duration of at least $T_z$=max(0.05 $T_x$, 100 us) before the start of the next period. This may apply to only the channel occupancy initiated by a UE and shared with a gNB. Alternatively, this may apply to not only the channel occupancy initiated by a UE and shared with a gNB but also a channel occupancy initiated by a gNB and shared with UE(s).

If a UE fails to access the channel(s) prior to an intended UL transmission to a gNB, Layer 1 notifies higher layers about the channel access failure.

Assume a case that terminal device 1 initiates a COT-u within a FFP-u including an IP-u. For example, terminal device 1 senses the channel for at least a sensing slot duration $T_{sl}$ transmits an uplink transmission burst(s) after the channel is sensed to be idle. A duration from the beginning of the FFP-u to the beginning of the IP-u is defined as a Maximum Channel Occupancy Time (MCOT). Terminal device 1 may transmit the uplink transmission burst(s) during the MCOT. An IP-g overlaps with the MCOT in time domain. Terminal device 1 may transmit the uplink transmission burst(s) within the MCOT, regardless of the IP-g. That is, terminal device 1 may transmit the uplink transmission burst(s) during the time that the IP-g overlaps with the MCOT. Alternatively, terminal device 1 may stop the uplink transmission within the MCOT before the beginning of the IP-g. That is, terminal device 1 may transmit the uplink transmission burst(s) before the beginning of the IP-g and does not transmit from the beginning of the IP-g to the beginning of the IP-u. Alternatively, terminal device 1 may pause the uplink transmission during the time that the IP-g overlaps with the MCOT. That is, within the MCOT, terminal device 1 may transmit the uplink transmission burst(s) before the beginning of the IP-g, stop uplink transmission during the time that the IP-g overlaps with the MCOT, and resume to transmit the uplink transmission burst(s) after the end of the IP-g. Before resuming the uplink transmission, terminal device 1 may sense the channel. Terminal device 1 may resume to transmit the uplink transmission burst(s) after sensing the channel to be idle for at least a sensing slot duration $T_{sl}$=9 us. The channel sensing may be started immediately after the end of the IP-g. Alternatively, the channel sensing may be started a duration $T_{resume-}$0 before the end of the IP-g. The duration $T_{resume-}$ may be provided/given/determined/predetermined by a value from {4 us, 5 us, 9 us, 16 us, 25 us} or [0 us, 100 us]. Alternatively, the channel sensing may be started the duration $T_{resume+}$ after the end of the IP-g. The duration $T_{resume+}$ may be provided/given/determined/predetermined by a value from {4 us, 5 us, 9u s, 16 us, 25 us} or [0 us, 100 us]. $T_{resume+}$ and $T_{resume-}$ may be the same. $T_{resume+}$ and $T_{resume-}$ may be different. Since base station device 3 may attempt to initiate a COT-g immediately after the end of the IP-g and senses the channel, by misaligning channel sensing periods of terminal device 1 and base station device 3, potential channel access collisions can be avoided and thus transmission efficiency can be improved.

Figure 13:
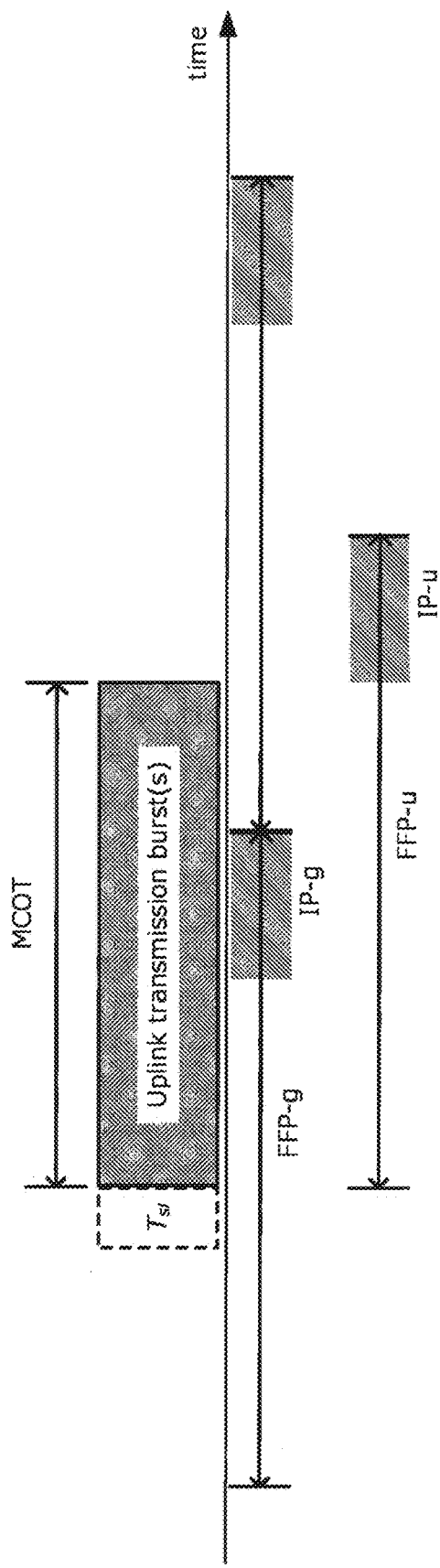
FIG. 13 is a diagram illustrating a method to handle uplink transmissions when an IP-g overlaps with an MCOT.

FIG. 13 is a diagram illustrating a method to handle uplink transmissions when an IP-g overlaps with an MCOT. In FIG. 13, terminal device 1 initiates a COT-u after sensing the channel to be idle for at least a sensing slot duration $T_{sl}$. Terminal device 1 may transmit uplink transmission burst(s) within MCOT from the beginning of FFP-u to the beginning of IP-u. IP-g overlaps with MCOT in time domain. The uplink transmission may be transmitted regardless of IP-g.

In FIG. 13, regardless of whether base station device 3 has already initiated one COT at the beginning of the FFP-g or not, terminal device 1 may initiate another COT at the beginning of the FFP-u where the FFP-g overlaps with the FFP-u and the FFP-g starts before the FFP-u.

In FIG. 13, in a case that base station device 3 has already initiated one COT at the beginning of the FFP-g, the terminal device 1 may not initiate another COT at the beginning of the FFP-u where the FFP-g overlaps with the FFP-u and the FFP-g starts before the FFP-u.

For example, in a case that terminal device 1 detects a DL transmission burst within the FFP-g, terminal device 1 may not initiate another COT at the beginning of the FFP-u where the FFP-g overlaps with the FFP-u and the FFP-g starts before the FFP-u. In that case, terminal device 1 may transmit a UL transmission burst within the MCOT within the FFP-g.

For example, in a case that terminal device 1 doesn't detect a DL transmission burst within the FFP-g, terminal device 1 may initiate another COT at the beginning of the FFP-u where the FFP-g overlaps with the FFP-u and the FFP-g starts before the FFP-u. In that case, terminal device 1 may transmit a UL transmission burst within the FFP-u.

Terminal device 1 may initiate a COT within the FFP-u based on whether a DL transmission burst is detected within the FFP-g or not where the FFP-g overlaps with the FFP-u and the FFP-g starts before the FFP-u.

Figure 14:
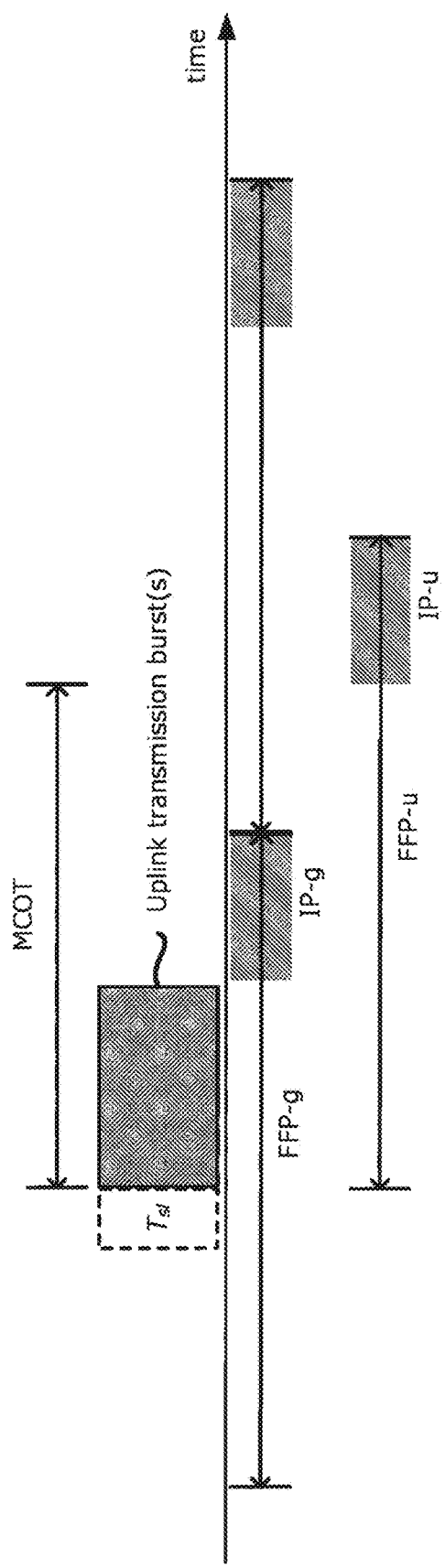
FIG. 14 is a diagram illustrating a method to handle uplink transmissions when an IP-g overlaps with an MCOT.

FIG. 14 is a diagram illustrating a method to handle uplink transmissions when an IP-g overlaps with an MCOT. In FIG. 13, terminal device 1 initiates a COT-u after sensing the channel to be idle for at least a sensing slot duration $T_{sl}$. Terminal device 1 may transmit uplink transmission burst(s) from the beginning of FFP-u to the beginning of IP-g. Terminal device 1 may not transmit uplink transmission burst(s) during a period that from the beginning of IP-g to the end of MCOT (or the beginning of IP-u). That is, from the beginning of IP-g, terminal device may stop uplink transmission in the current FFP-u.

Figure 15:
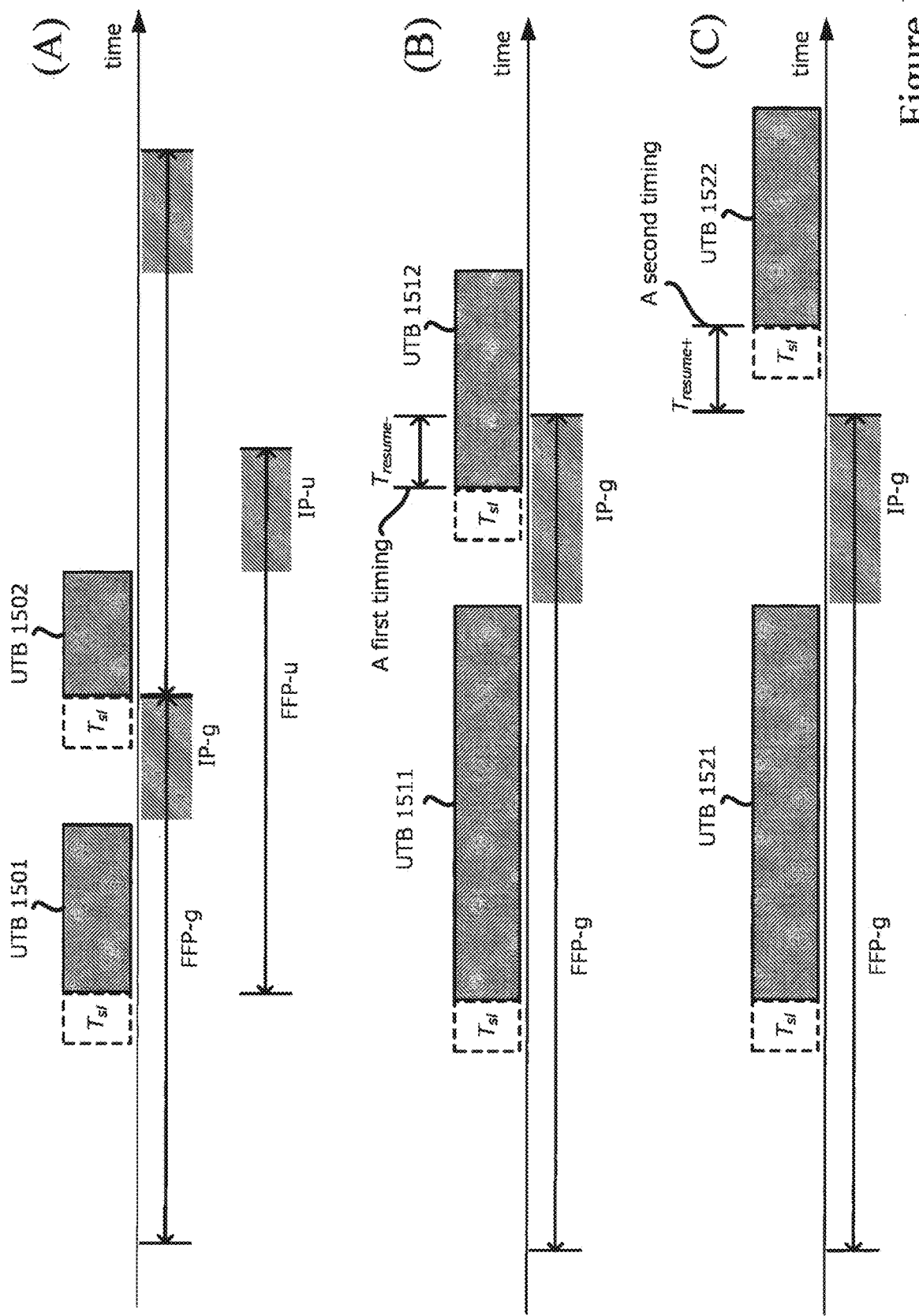
FIG. 15 is a diagram illustrating methods to handle uplink transmissions when an IP-g overlaps with an MCOT.

FIG. 15 is a diagram illustrating methods to handle uplink transmissions when an IP-g overlaps with an MCOT. In FIG. 15, terminal device 1 initiates a COT-u after sensing the channel to be idle for at least a sensing slot duration $T_{sl}$. IP-g overlaps with MCOT in time domain. Terminal device 1 may transmit uplink transmission burst(s) within MCOT from the beginning of FFP-u and pause/stop the uplink transmission at during IP-g. Here, UTB is used as the abbreviation of Uplink Transmission Burst(s). In FIG. 15

(A), terminal device 1 may transmit UTB 1501 until the beginning of IP-g. Terminal device 1 may not transmit during IP-g. Terminal device 1 may transmit UTB 1502 after sensing the channel to be idle for at least the sensing slot duration $T_{sl}$. Terminal device 1 may transmit UTB 1502 from the end of IP-g to the beginning of IP-u. In FIG. 15 (B), terminal device 1 may transmit UTB 1511 before or until the beginning of IP-g. Terminal device 1 may not transmit from the beginning of IP-g to a first timing. The first timing is a period $T_{resume-}$ before the end of IP-g. Terminal device 1 may transmit UTB 1512 after sensing the channel to be idle for at least the sensing slot duration $T_{sl}$. Here, the channel sensing may be completed before the first timing. Terminal device 1 may transmit UTB 1512 before or to the beginning of IP-u. In FIG. 15 (C), terminal device 1 may transmit UTB 1521 before or until the beginning of IP-g. Terminal device 1 may not transmit from the beginning of IP-g to a second timing. The second timing is a period $T_{resume+}$ after the end of IP-g. Terminal device 1 may transmit UTB 1522 after sensing the channel to be idle for at least the sensing slot duration $T_{sl}$. Here, the channel sensing may be completed before the second timing. Terminal device 1 may transmit UTB 1522 before or to the beginning of IP-u.

Each of a program running on the base station device 3 and the terminal device 1 according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:
1. A terminal device comprising:
reception circuitry configured to sense a channel, receive a Fixed Frame Period (FFP)-g configuration including an Idle Period (IP)-g configuration and FFP-u configuration including IP-u configuration; and
transmission circuitry configured to initiate a Channel Occupancy Time (COT)-u at the beginning of an FFP-u after the channel is sensed to be idle and transmit an uplink transmission burst within the COT-u; wherein a maximum COT is a duration from the beginning of the COT-u to the beginning of an IP-u included in the FFP-u, and in a case that the maximum COT overlaps with an IP-g and the beginning of the IP-g is before the beginning of the IP-u, the uplink transmission is stopped before or at the beginning of the IP-g.

2. A base station comprising:

base station reception circuitry configured to sense a channel, receive a Fixed Frame Period (FFP)-g configuration including an Idle Period (IP)-g configuration and FFP-u configuration including IP-u configuration; and base station transmission circuitry configured to initiate a Channel Occupancy Time (COT)-u at the beginning of an FFP-u after the channel is sensed to be idle and transmit an uplink transmission burst within the COT-u; wherein a maximum COT is a duration from the beginning of the COT-u to the beginning of an IP-u included in the FFP-u, and in a case that the maximum COT overlaps with an IP-g and the beginning of the IP-g is before the beginning of the IP-u, the uplink transmission is stopped before or at the beginning of the IP-g.

3. A method of using a terminal device, the method comprising:

sensing a channel and receiving a Fixed Frame Period (FFP)-g configuration including an Idle Period (IP)-g configuration and FFP-u configuration including IP-u configuration; and initiating a Channel Occupancy Time (COT)-u at the beginning of an FFP-u after the channel is sensed to be idle and transmit an uplink transmission burst within the COT-u; wherein a maximum COT is a duration from the beginning of the COT-u to the beginning of an IP-u included in the FFP-u, and in a case that the maximum COT overlaps with an IP-g and the beginning of the IP-g is before the beginning of the IP-u, the uplink transmission is stopped before or at the beginning of the IP-g.

* * * * *